United States Patent
Yamaguchi et al.

(10) Patent No.: US 8,531,644 B2
(45) Date of Patent: Sep. 10, 2013

(54) OPTICAL DEVICE AND DISPLAY

(75) Inventors: Hajime Yamaguchi, Kawasaki (JP); Rei Hasegawa, Yokohama (JP); Takashi Miyazaki, Kawasaki (JP); Hitoshi Nagato, Kunitachi (JP); Haruhi Oooka, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 154 days.

(21) Appl. No.: 13/111,591

(22) Filed: May 19, 2011

(65) Prior Publication Data

US 2011/0279756 A1 Nov. 17, 2011

Related U.S. Application Data

(63) Continuation of application No. PCT/JP2009/069577, filed on Nov. 18, 2009.

(30) Foreign Application Priority Data

Nov. 19, 2008 (JP) .................. 2008-295851

(51) Int. Cl.
*C09K 19/02* (2006.01)
*G02F 1/1333* (2006.01)

(52) U.S. Cl.
USPC ........................................ 349/182; 349/90

(58) Field of Classification Search
USPC .................................................. 349/182, 90
See application file for complete search history.

(56) References Cited

FOREIGN PATENT DOCUMENTS

| JP | 2004-233655 | 8/2004 |
|---|---|---|
| JP | 2007-11260 | 1/2007 |
| JP | 2007-240668 | 9/2007 |
| JP | 2007-279163 | 10/2007 |

OTHER PUBLICATIONS

Japanese International Search Report mailed Feb. 23, 2010 in PCT/JP2009/069577 filed Nov. 18, 2009.
Japanese Written Opinion mailed Feb. 12, 2010 in PCT/JP2009/069577 filed Nov. 18, 2009.
Hiroki Iwanaga et al., "Oligothiophene dyes for gues-host liquid crystal displays", Liquid Crystals, 2000, vol. 27, No. 1, pp. 115-123.
Lars-Olof Palsson et al., "Orientation and Solvatochromism of Dyes in Liquid Crystals", Mol. Cryst. Liq. Cryst., 2003, vol. 402, pp. 43/[279]-53/[289].
English Translation of the International Preliminary Report on Patentability and Written Opinion issued Jun. 30, 2011 in PCT/JP2009/069577.

*Primary Examiner* — Wen-Ying P Chen
(74) *Attorney, Agent, or Firm* — Oblon, Spivak, McClelland, Maier & Neustadt, L.L.P.

(57) ABSTRACT

According to one embodiment, an optical device includes an optically variable layer and first and second electrodes. The optically variable layer includes a material having dielectric anisotropy and a solvatochromic dye. The first and second electrodes are configured to apply a voltage to the optically variable layer. According to another embodiment, a display includes an optical device and a driving circuit. The optical device includes an optically variable layer and first and second electrodes. The optically variable layer includes a material having dielectric anisotropy and a solvatochromic dye. The first and second electrodes are configured to driving circuit is configured to put a drive voltage across the first and second electrodes.

13 Claims, 11 Drawing Sheets

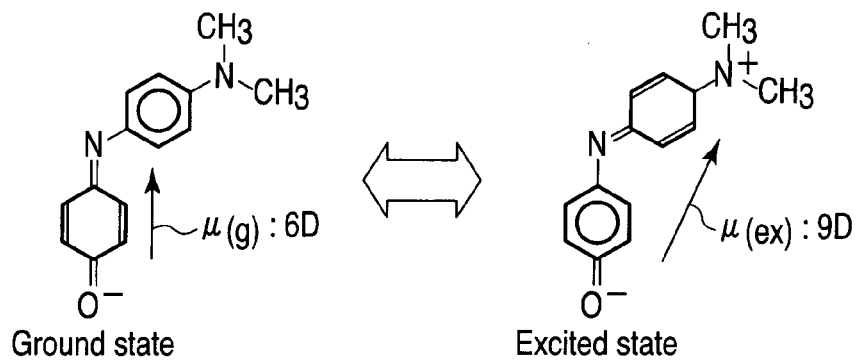
Ground state      Excited state
F I G. 1
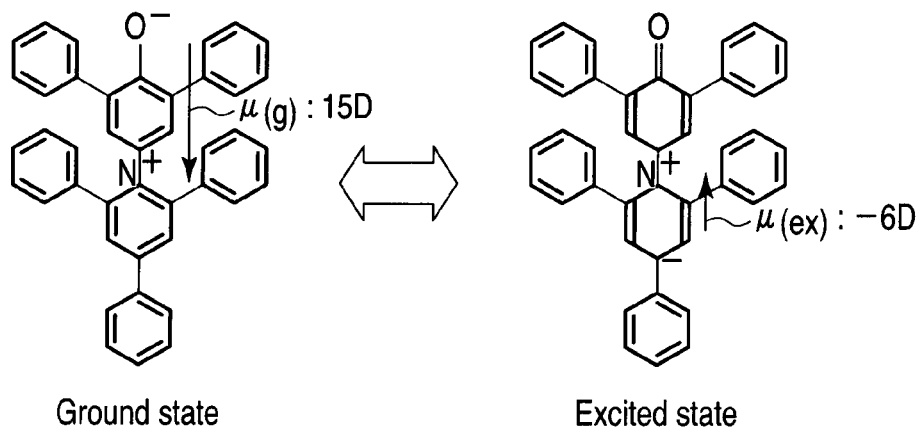
Ground state      Excited state
F I G. 2
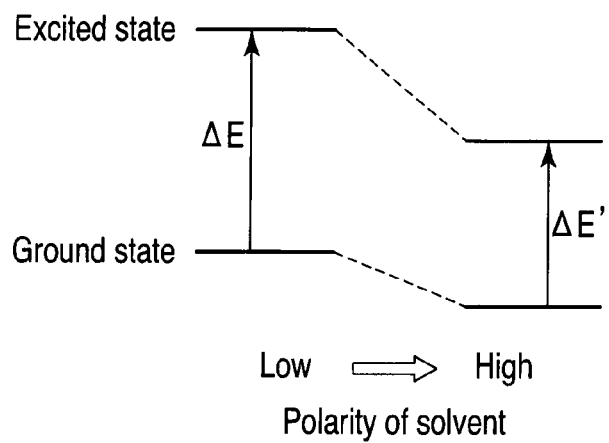
F I G. 3

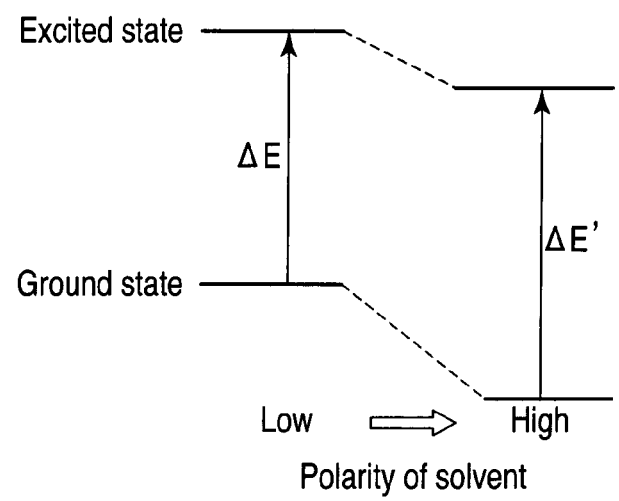
F I G. 4
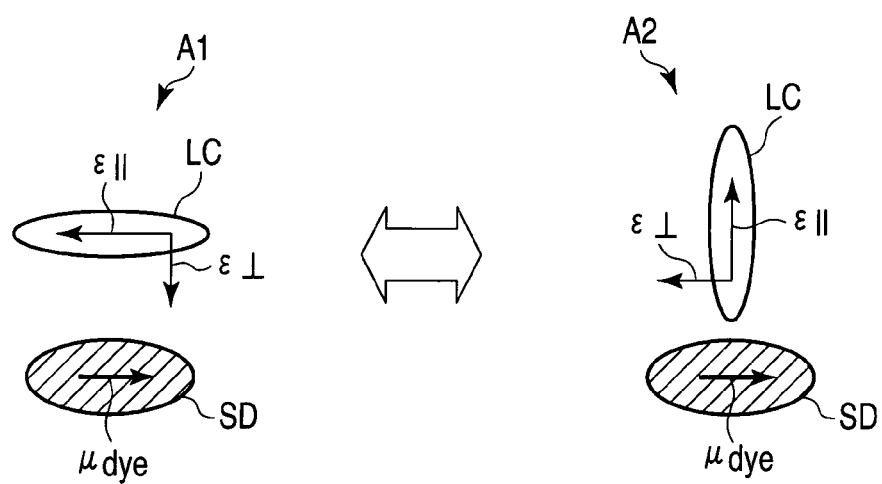
F I G. 5

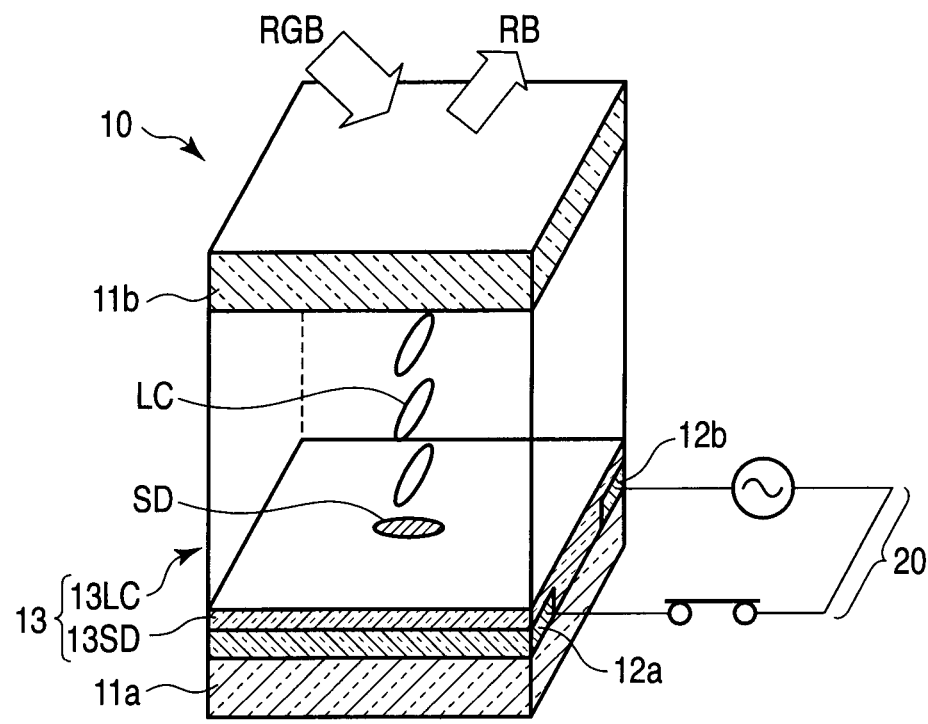
F I G. 12
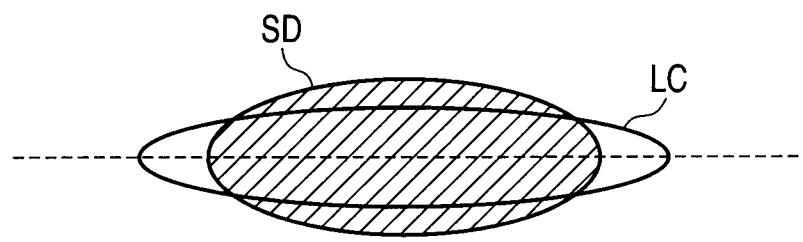
F I G. 13

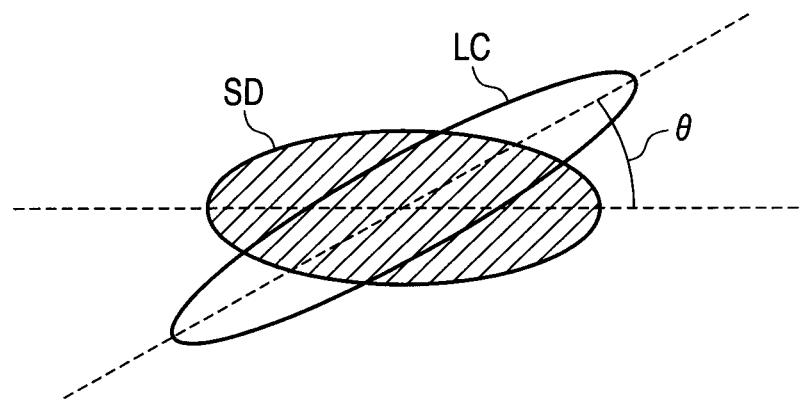
F I G. 14
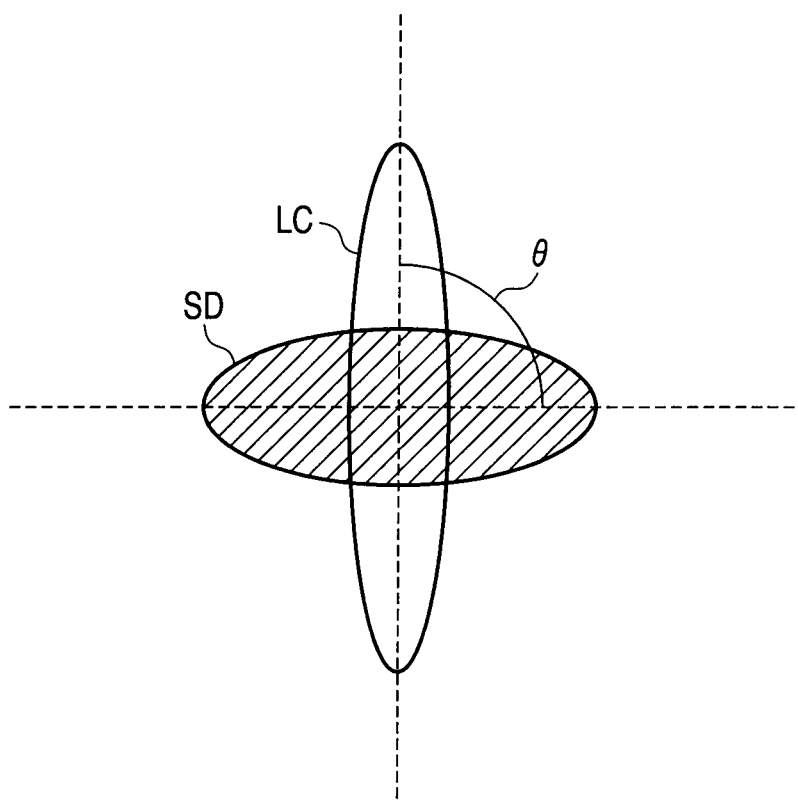
F I G. 15

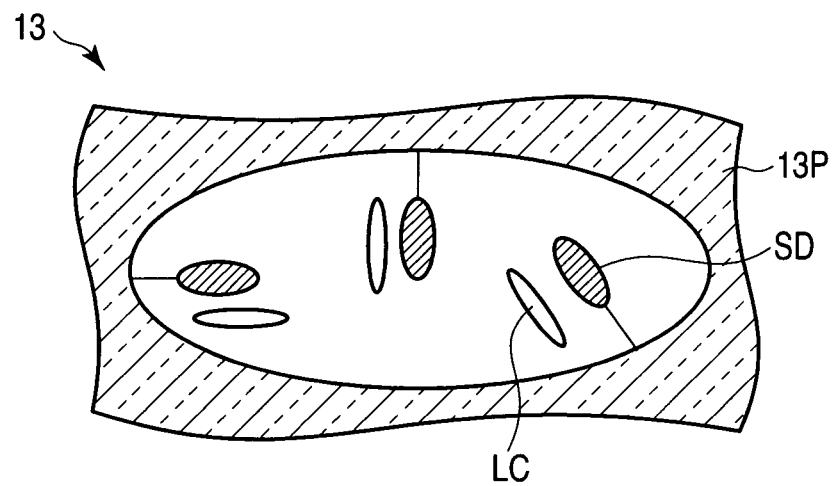
F I G. 18
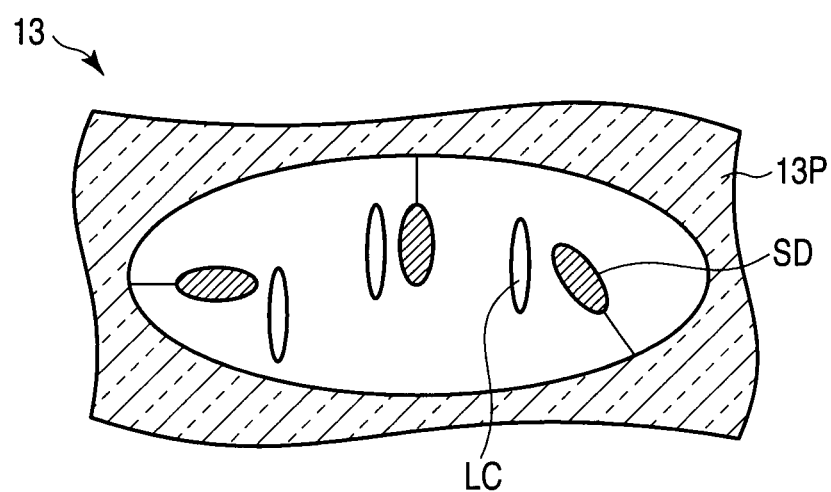
F I G. 19

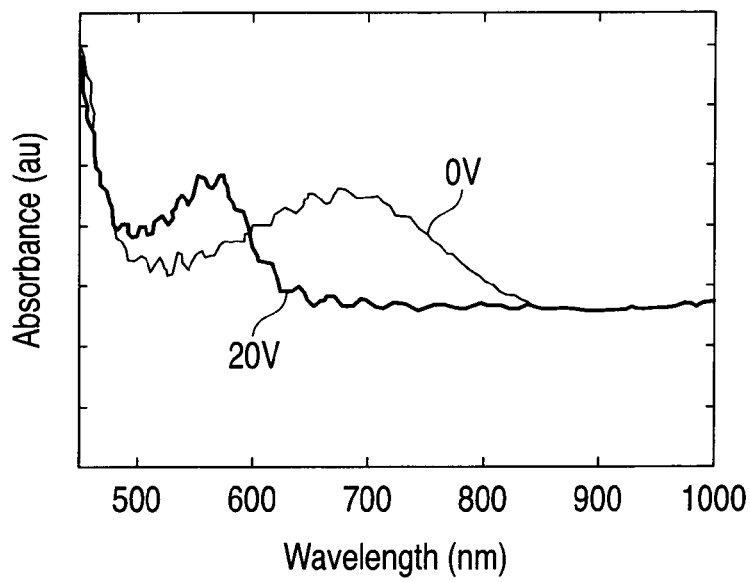
F I G. 20
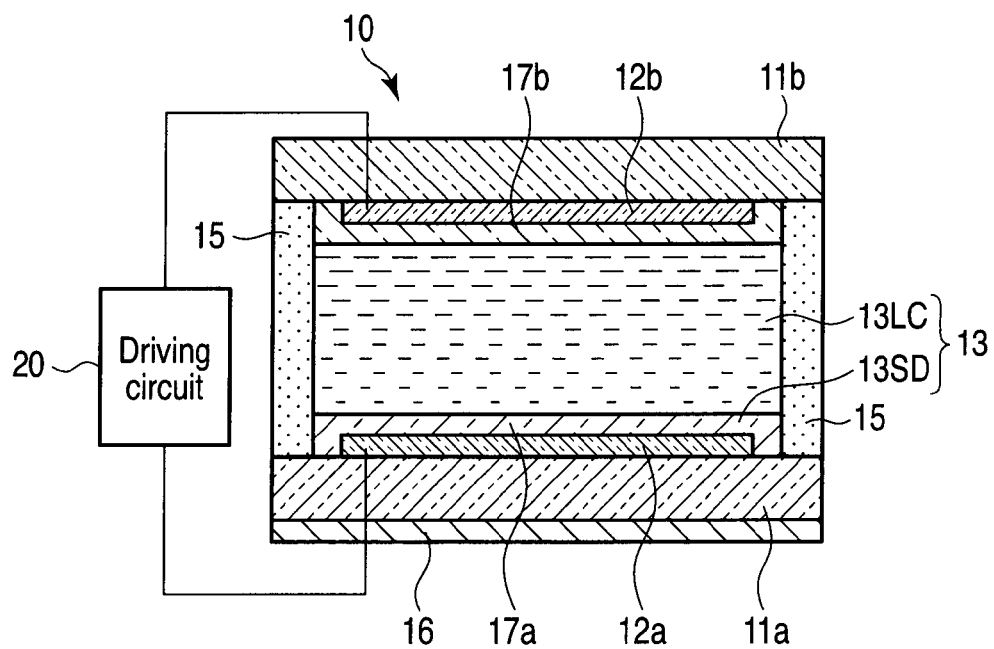
F I G. 21

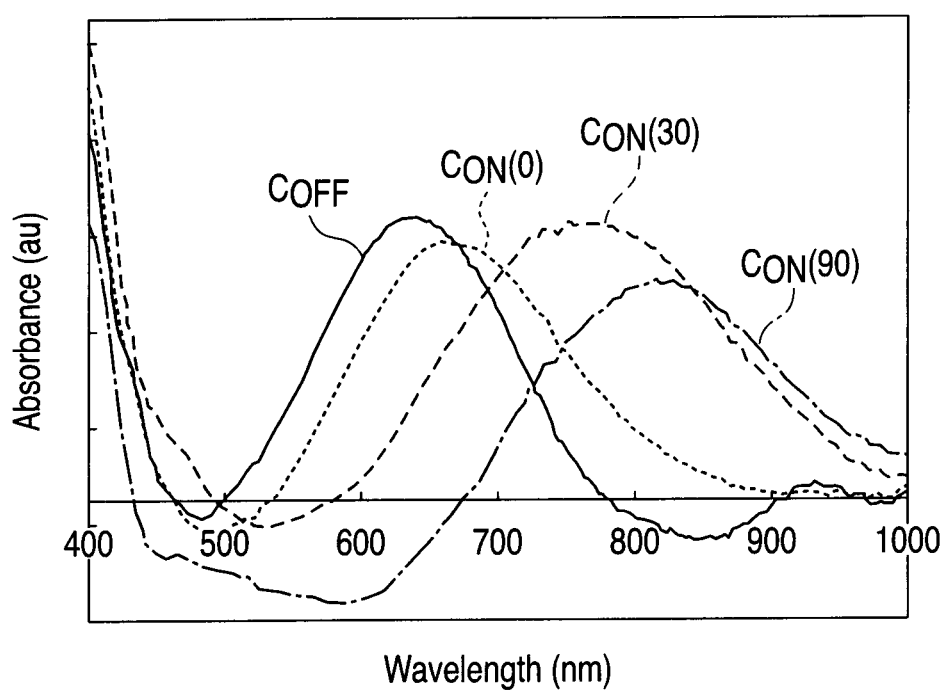
F I G. 22

OPTICAL DEVICE AND DISPLAY

CROSS REFERENCE TO RELATED APPLICATIONS

This is a Continuation Application of PCT Application No. PCT/JP2009/069577, filed Nov. 18, 2009, which was published under PCT Article 21(2) in Japanese.

This application is based upon and claims the benefit of priority from Japanese Patent Application No. 2008-295851, filed Nov. 19, 2008; the entire contents of which are incorporated herein by reference.

FIELD

Embodiments described herein relate generally to an optical technique.

BACKGROUND

Electronic papers are displays that are capable of changing display images and have portability comparable to papers. The electronic papers can partially replace papers used for distributing information. Therefore, the electronic papers can contribute to conserve the forest resources.

In the case where a color filter is used in such a display in order to display a multicolored image, it is difficult to achieve a high resolution and a thickness that is comparable to a paper. Thus, it is desirable that the display can display a multicolored image with no color filter. Further, electric methods are advantageous to change display images.

BRIEF DESCRIPTION OF THE DRAWINGS

FIG. 1 is a view showing an example of dye exhibiting a positive solvatochromism and its dipole moments in the ground and excited states;

FIG. 2 is a view showing an example of dye exhibiting a negative solvatochromism and its dipole moments in the ground and excited states;

FIG. 3 is an energy diagram of the solvatochromism exhibited by the dye shown in FIG. 1;

FIG. 4 is an energy diagram of the solvatochromism exhibited by the dye shown in FIG. 2;

FIG. 5 is a view schematically showing a relationship between a dipole moment of a dye molecule and an orientational state of solvent molecules;

FIG. 12 is a view schematically showing a state in which the optical device of FIG. 10 displays cyan;

FIG. 13 is a view schematically showing a solvatochromic dye molecule and a liquid crystal molecule in the state of FIG. 10;

FIG. 14 is a view schematically showing the solvatochromic dye molecule and the liquid crystal molecule in the state of FIG. 11;

FIG. 15 is a view schematically showing the solvatochromic dye molecule and the liquid crystal molecule in the state of FIG. 12;

FIG. 18 is a view schematically showing a state in which an optical device according to the fourth embodiment displays an image in a certain color;

FIG. 19 is a sectional view schematically showing a state in which the optical device of FIG. 18 displays an image in another color;

FIG. 20 is a graph showing an example of a color change responsive to a change in voltage;

FIG. 21 is a sectional view schematically showing an optical device according to Example 3; and FIG. 22 is a graph showing another example of a color change responsive to a change in voltage.

DETAILED DESCRIPTION

Figure 6:
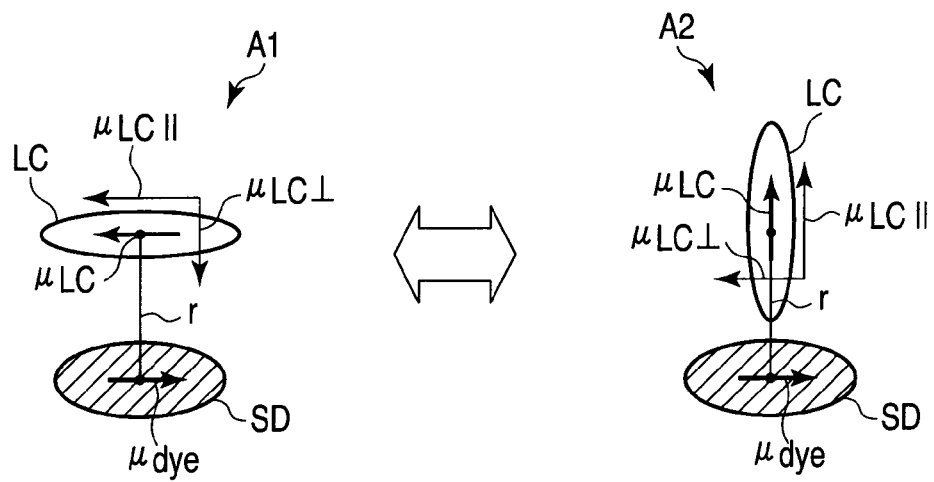
FIG. 6 is a view schematically showing an interaction between a dipole of a dye molecule and a dipole and induced dipole of a solvent molecule.

In general, according to one embodiment, an optical device includes an optically variable layer and first and second electrodes. The optically variable layer includes a material having dielectric anisotropy and a solvatochromic dye. The first and second electrodes are configured to apply a voltage to the optically variable layer.

According to another embodiment, a display includes an optical device and a driving circuit. The optical device includes an optically variable layer and first and second electrodes. The optically variable layer includes a material having dielectric anisotropy and a solvatochromic dye. The first and second electrodes are configured to driving circuit is configured to put a drive voltage across the first and second electrodes.

Various embodiments will be described below with reference to the accompanying drawings. Note that the same reference characters in the drawings denote components that achieve the same or similar functions, and a repetitive explanation thereof will be omitted.

First, solvatochromism will be explained.

Solvatochromism is a phenomenon in which colors of dye solutions vary depending on the solvents used and is considered to be as follows.

As for a dye molecule that has a large electric dipole moment (hereinafter, "dipole moment" is used to mean "electric dipole moment") and causes a great change in magnitude of the dipole moment when a transition between the ground and excited states occurs, the higher the polarity of the solvent is, the more stable one of the ground and excited states is. As a result, the electronic transition energy from the ground state to the excited state changes, which causes a shift in the absorption wavelength. This phenomenon is called "solvatochromism", and a dye causing exhibiting such a phenomenon is called "solvatochromic dye".

The solvatochromism will be described in more detail with reference to equations and figures.

$$\Delta E - \Delta E' = -(\mu_{(ex)} - \mu_{(g)})[\mu_{(g)}\{L(\varepsilon) - L(n^2)\} + (\mu_{(ex)} + \mu_{(g)})L(n^2)] \quad (1)$$

$$L(x) = \frac{2(x-1)}{(2x+1)} \quad (2)$$

In the above equation (1), ΔE and ΔE' represent the electronic transition energies for the transition of a solvatochromic dye from the ground state to the excited state in the case where the polarity of the solvent is low and in the case where the polarity of the solvent is high, respectively. $\mu_{(g)}$ and $\mu_{(ex)}$ represent dipole moments of the dye molecule in the ground and excited states, respectively. ∈ and n represent the dielectric constant and refractive index of the solvent, respectively. Note that L(∈) and L(n²) are values derived from the above equation (2).

The equation (1) is called "MacRae model" and indicates that the difference of the electronic transition energy ΔE in the case of using a solvent with a high polarity and the electronic transition energy ΔE' in the case of using a solvent with a low polarity, i.e., the amount of change ΔE–ΔE' in the electronic transition energy is a function of the dipole moments $\mu_{(g)}$ and $\mu_{(ex)}$, dielectric constant ∈ and refractive index n. Here, for ease of explanation, the angle that the dipole moment in the excited state forms with the dipole moment in the ground state is supposed to be 0° (or 180°). Although the concept of polarity of a solvent includes hydrogen-bonding and electron-donating properties, these properties are not considered in the MacRae model.

As will be apparent from the equation (1), the dipole moments of the dye in the ground and excited states are greatly differ in magnitude from each other. That is, the equation shows that the amount of change ΔE–ΔE' is large in the case where the difference in magnitude between the dipole moments $\mu_{(g)}$ and $\mu_{(ex)}$ is large and that the amount of change ΔE–ΔE' is large in the case where each of the dipole moments $\mu_{(g)}$ and $\mu_{(ex)}$ is large. In other words, the relationship between the dipole moment and the shift amount of the absorption wavelength, i.e., the amount of change in color of the dye can be understood from the equation. In addition, it can be understood from the equation that the polarity of the amount of change ΔE–ΔE', i.e., the direction of change in the absorption wavelength depends on the sign of the difference $\mu_{(g)}-\mu_{(ex)}$.

FIG. 1 is a view showing an example of dye exhibiting a positive solvatochromism and its dipole moments in the ground and excited states. FIG. 2 is a view showing an example of dye exhibiting a negative solvatochromism and its dipole moments in the ground and excited states. FIG. 3 is an energy diagram of the solvatochromism exhibited by the dye shown in FIG. 1. FIG. 4 is an energy diagram of the solvatochromism exhibited by the dye shown in FIG. 2. FIG. 1 shows Phenol Blue dye as an example of dye exhibiting a positive solvatochromism. FIG. 2 shows Reichardt dye as an example of dye exhibiting a negative solvatochromism. Note that the structural formulae shown in FIGS. 1 and 2 do not necessarily represent the electron densities in the compounds with accuracy.

In the case where the difference $\mu_{(g)}-\mu_{(ex)}$ is a positive value as shown in FIG. 1, the solvatochromism is called positive solvatochromism. In this case, when the polarity of the solvent is increased as shown in FIG. 3, the absorption wavelength shifts toward longer wavelengths.

In the case where the difference $\mu_{(g)}-\mu_{(ex)}$ is a negative value as shown in FIG. 2, the solvatochromism is called negative solvatochromism. In this case, when the polarity of the solvent is increased as shown in FIG. 4, the absorption wavelength shifts toward shorter wavelengths.

The effect of a solvent on the solvatochromism will be described in more detail.

In the equation (1), the value L(n²) indicates the electronic polarization, while the difference L(∈)–L(n²) between the value L(∈) and the value L(n²) indicates the orientation polarization, which is the dielectric constant subtracted by the contribution of the electronic polarization. As will be apparent from the equation (1), in the case where the degrees of the electronic polarization and orientation polarization are high, the amount of change ΔE–ΔE' is large. That is, in this case, the amount of change in color of the dye is large.

The orientation polarization of a solvent is caused by the dipole of the solvent. On the other hand, the electronic polarization of the solvent is caused by the induced dipole. Thus, it can be said that the solvatochromism a phenomenon effected by the interaction between the dipole of the dye molecule and the dipole and induced dipole of the solvent in the vicinity of the dye molecule. Accordingly, if the interaction can be controlled using electric field, the color of the solvatochromic dye, in particular, the hue thereof should be changed without replacing the solvent.

In each of the embodiments described later in detail, a material having dielectric anisotropy is positioned in the vicinity of the solvatochromic dye, and an electric drive signal is supplied to the material having dielectric anisotropy. By doing so, a color change of the solvatochromic dye can be achieved without replacing the solvent.

The color change will be described with reference to FIGS. 5 and 6.

FIG. 5 is a view schematically showing a relationship between a dipole moment of a dye molecule and an orientational state of solvent molecules. In FIG. 5, supposed is the case where a liquid crystal material is used as the material having dielectric anisotropy.

As described above, although the polarity of a solvent cannot be translated directly into the dielectric constant, the polarity of the solvent is considered in terms of the dielectric constant based on the MacRae model.

A liquid crystal material is a material having dielectric anisotropy in which the dielectric constant in the long axis of the molecular differs from the dielectric constant in the direction perpendicular to the long axis.

In the orientation state A1 shown in FIG. 5, the dipole moment $\mu_{dye}$ of the solvatochromic dye molecule SD is parallel with the long axis of the liquid crystal molecule LC. On the other hand, in the orientation state A2 shown in FIG. 5, the dipole moment $\mu_{dye}$ of the solvatochromic dye molecule SD is perpendicular to the long axis of the liquid crystal molecule LC.

Thus, in the orientation state A1, the solvatochromic dye molecule SD is considered to be in the environment of the dielectric constant ∈∥ that is parallel with the long axis of the liquid crystal molecule LC. On the other hand, in the orientation state A2, the solvatochromic dye molecule SD is considered to be in the environment of the dielectric constant ∈⊥ that is parallel with the long axis of the liquid crystal molecule LC.

FIG. 6 is a view schematically showing a interaction between a dipole of a dye molecule and a dipole and induced dipole of a solvent molecule. Here, the liquid crystal molecule LC is supposed to be a nematic liquid crystal molecule having positive dielectric anisotropy (∈∥>∈⊥).

In the orientation state A1, the induced dipole moment $\mu_{LC}\perp$ of the liquid crystal molecule LC caused by the refractive index $\alpha_0\perp$ parallel with the short axis thereof is perpendicular to the dipole moment $\mu_{dye}$ of the dye molecule SD. On the other hand, in the orientation state A2, the induced dipole moment $\mu_{LC}\|$ of the liquid crystal molecule LC caused by the dipole moment $\mu_{LC}$ of the liquid crystal molecule LC and the refractive index $\alpha_0\|$ parallel with the long axis thereof is perpendicular to the dipole moment $\mu_{dye}$ of the dye molecule SD. No interaction exists between the dipole moments perpendicular to each other.

Therefore, in the orientation state A1, the dipole moment $\mu_{LC}$ of the liquid crystal molecule LC and the induced dipole moment $\mu_{LC}$ caused by the refractive index $\alpha_0\|$ parallel with the long axis of the liquid crystal molecule LC interact with the dipole moment $\mu_{dye}$ of the dye molecule SD. On the other hand, in the orientation state A2, the induced dipole moment $\mu_{LC}\perp$ caused by the refractive index $\alpha_0\perp$ parallel with the short axis of the liquid crystal molecule LC interacts with the dipole moment $\mu_{dye}$ of the dye molecule SD.

Therefore, the energy received by the dipole moment $\mu_{dye}$ of the dye molecule SD in the orientation state A1 is $-\mu_{dye}\mu_{LC}/(4\pi\epsilon_0 r^3) - 2\mu_{dye}^2 \alpha_0\|/((4\pi\epsilon_0)^2 r^6)$. On the other had, the energy received by the dipole moment $\mu_{dye}$ of the dye molecule SD in the orientation state A2 is $-2\mu_{dye}^2 \alpha_0\perp/((4\pi\epsilon_0)^2 r^6)$. Here, "$\epsilon_0$" indicates the dielectric constant in vacuum and "r" indicates the distance between the liquid crystal molecule LC ad the dye molecule SD.

Thus, the interaction between the dipole of the dye molecule SD and the dipole and induced dipole of the liquid crystal molecule LC in the orientation state A1 is stronger than that in the orientation state A2. As described above, the strength of the interaction effects on the color of the solvatochromic dye. The change between the orientation states A1 and A2 can be caused using electric field. Therefore, when a solvatochromic dye is used in combination with a liquid crystal material, the color of the solvatochromic dye can be changed using electric field. Accordingly, when this technique is used, a multicolored image can be displayed without using a color filter.

In addition, since the color of the solvatochromic dye shows a correlation with the strength of the interaction between the dipole of the dye molecule SD and the dipole and induced dipole of the liquid crystal molecule LC, when the intensity of the electric field is changed among three or more values, three or more colors can be displayed. Therefore, in the case of applying this technique to a display, a multicolored image can be displayed with employing a relatively simple structure in each pixel.

For example, in a guest-host liquid crystal display utilizing subtractive color mixture for displaying a full color image, three liquid crystal layers corresponding to the three primary colors should be stacked. By contrast, according to the above-described technique, a single layer containing a solvatochromic dye and a liquid crystal material can display, for example, the three primary colors, neutral colors and white. Therefore, in the case of increasing the definition, degradation in image quality due to parallax is less prone to occur.

Further, the intensity of electric field can be controlled with a high degree of accuracy. Thus, according to the above-described technique, a high degree of color reproducibility can be achieved.

In a liquid crystal display utilizing birefringence, achieving a wide viewing angle is difficult. In addition, polarizers are necessary in such a liquid crystal display utilizing birefringence. By contrast, according to the above-described technique, achieving a wide viewing angle is easy because light absorption of a solvatochromic dye is utilized. Further, according to the above-described technique, an image can be displayed at a higher brightness because no polarizer is necessary.

Figure 7:
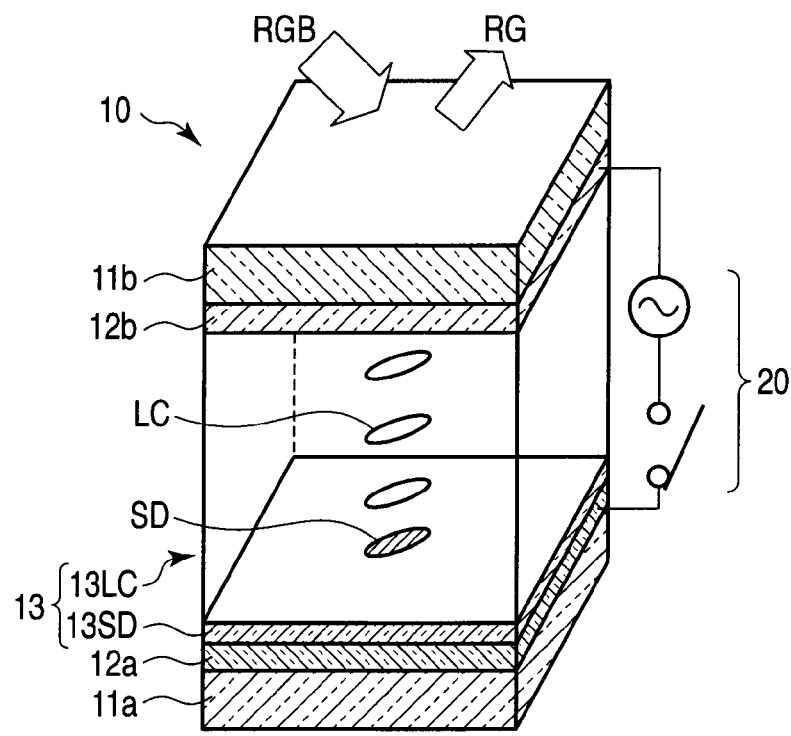
FIG. 7 is a view schematically showing a state in which an optical device according to the first embodiment displays yellow.
Figure 8:
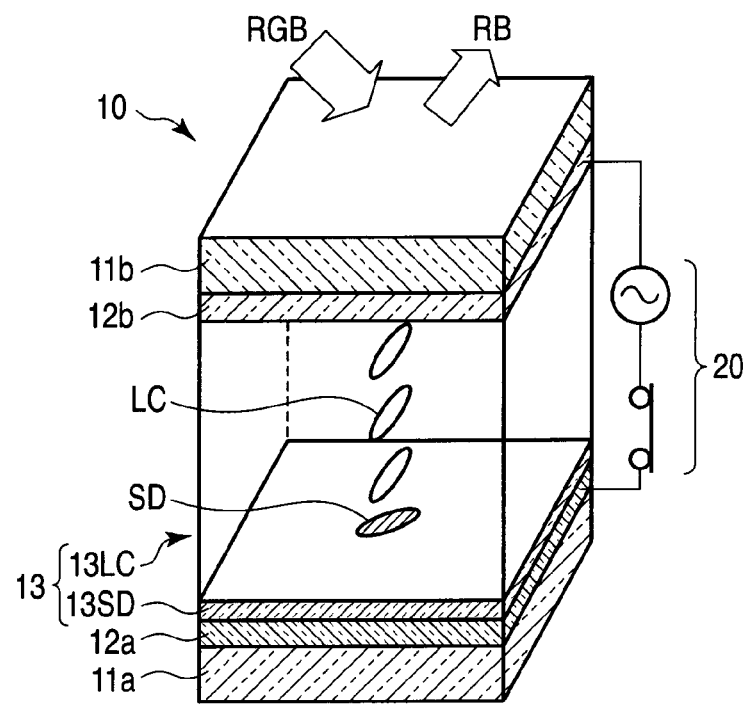
FIG. 8 is a view schematically showing a state in which the optical device of FIG. 7 displays magenta.
Figure 9:
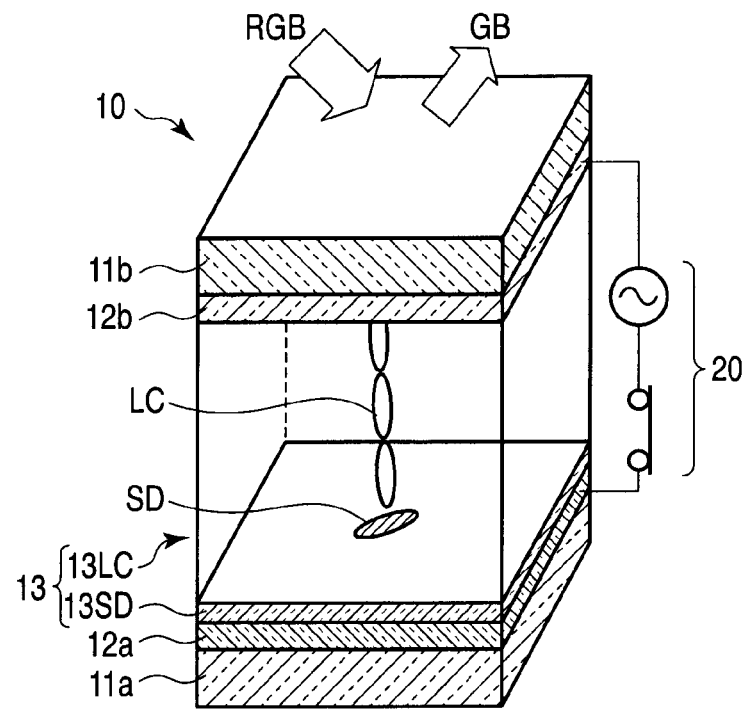
FIG. 9 is a view schematically showing a state in which the optical device of FIG. 7 displays cyan.

FIG. 7 is a view schematically showing a state in which an optical device according to the first embodiment displays yellow. FIG. 8 is a view schematically showing a state in which the optical device of FIG. 7 displays magenta. FIG. 9 is a view schematically showing a state in which the optical device of FIG. 7 displays cyan.

The optical device 10 shown in FIGS. 7 to 9 is a reflective optical device. The optical device 10 includes substrates 11a and 11b, a sealing layer (not shown), electrodes 12a and 12b, an optically variable layer 13, and a reflective layer (not shown). The backside of the optical device 10 is on a side of the substrate 11a, while the front side of the optical device 10 is on a side of the substrate 11b.

The substrates 11a and 11b face each other. The substrate 11b has a light-transmitting property and is typically colorless and/or transparent.

The sealing layer is in a form of frame and interposed between the substrates 11a and 11b. The substrates 11a and 11b and the sealing layer form a cell having a hollow structure. In this cell, spacers may be arranged in order to increase the degree of uniformity in the distance between the substrates 11a and 11b.

The electrodes 12a and 12b are placed between the substrates 11a and 11b. The electrodes 12a and 12b are supported by the substrates 11a and 11b, respectively. The electrodes 12a and 12b have a light-transmitting property and is typically colorless and/or transparent.

The optically variable layer 13 includes a material having dielectric anisotropy and a solvatochromic dye. Specifically, the optically variable layer 13 includes a dye layer 13SD and a liquid crystal layer 13LC.

The dye layer 13SD covers the electrode 12a. The dye layer 13SD includes a solvatochromic dye SD immobilized on the electrode 12a. Here, as an example, the solvatochromic dye SD is supposed to exhibit negative solvatochromism. Here, as an example, it is also supposed that the molecules of the solvatochromic dye SD orient in a direction parallel with a surface of the substrate 11a facing the substrate 11b. Hereinafter, this direction is referred to as "orientational direction of dye molecule SD". Note that an insulating layer may be interposed between the dye layer 13SD and the electrode 12a. Alternatively, the dye layer 13SD may further include an insulating layer on which the solvatochromic dye SD is immobilized.

The liquid crystal layer 13LC is interposed between the dye layer 13SD and the electrode 12b. The liquid crystal layer 13LC is a layer of a liquid crystal material filling the enclosed space surrounded by the substrates 11a and 11b and the sealing layer. Here, as an example, it is supposed that the liquid crystal material is a nematic liquid crystal material having positive dielectric anisotropy and that the long axes or dipole moments of the liquid crystal molecules LC are oriented almost parallel with the orientational direction of the dye molecules. Hereinafter, the direction of the ling axis or dipole moment of the liquid crystal molecule LC is referred to as "orientational direction of liquid crystal molecule LC".

Note that the liquid crystal molecules can be oriented by, for example, providing an alignment layer adjacent to the liquid crystal layer 13LC or performing an alignment treatment on a layer adjacent to the liquid crystal layer 13LC. For the formation of the alignment layer or the alignment treatment, for example, the rubbing treatment or photo-alignment technique can be utilized.

The reflective layer is placed on the backside of the substrate 11a. The reflective layer may be placed between the substrate 11a and the dye layer 13SD. Alternatively, a light-reflecting electrode such as metal or alloy layer may be used as the electrode 12a instead of providing the reflective layer.

The electrodes 12a and 12b of the optical device 10 are connected to a driving circuit 20. The driving circuit includes a variable-voltage source. The variable-voltage source may be an alternating-current or direct-current voltage source.

Note that the combination of the optical device 10 and the driving circuit 20 can be used as, for example, a display.

When the front surface of the optical device 10 is illuminated with white light, the white light passes through the substrate 11b, the electrode 12b and the liquid crystal layer 13LC in this order, and then enters the dye layer 13SD. The dye layer 13SD absorbs a part of the incident light and transmits another part of the incident light. The light transmitted by the dye layer 13SD passes through the substrate 11a and is reflected by the reflective layer. The reflected light passes through the substrate 11a and enters the dye layer 13SD. The dye layer 13SD absorbs a part of the incident light and transmits another part of the incident light. The light transmitted by the dye layer 13SD passes through the liquid crystal layer 13LC, the electrode 12b and the substrate 11b in this order. The observer perceives the transmitted light as the light for image display. That is, the observer perceives the color that is in relation of complementary colors with the light absorbed by the dye layer 13SD.

As shown in FIG. 7, in the case where no voltage is applied between the electrodes 12a and 12b, the orientational direction of the liquid crystal molecules LC is parallel with the orientational direction of the dye molecules SD. This state corresponds to the orientation state A1 described with reference to FIGS. 5 and 6. In this state, the dye layer 13SD absorbs, for example, blue light. In this case, the observer perceives yellow that is in relation of complementary colors with blue.

When a voltage whose absolute value is relatively small (hereinafter, "voltage" is supposed to be zero or positive value for ease of explanation) is applied between the electrodes 12a and 12b, the liquid crystal molecules LC incline with respect to the substrate 11a. As a result, the absorption wavelength range of the dye layer 13SD shifts toward longer wavelengths. In this state, the dye layer 13SD absorbs, for example, green light. In this case, the observer perceives magenta that is in relation of complementary colors with green.

When the voltage applied between the electrodes 12a and 12b is raised, the liquid crystal molecules LC orient almost perpendicular to the main surface of the substrate 11a, i.e., almost perpendicular to the display surface. This state corresponds to the orientation state A2 described with reference to FIGS. 5 and 6. In this state, the dye layer 13SD absorbs, for example, red light. In this case, the observer perceives cyan that is in relation of complementary colors with red.

Note that in the case of using a solvatochromic dye SD exhibiting positive solvatochromism, when the voltage applied between the electrodes 12a and 12b is raised, the absorption wavelength range of the dye layer 13SD shifts toward shorter wavelengths. Therefore, in this case, it is possible to employ the design in which the dye layer 13SD absorbs red light when no voltage is applied between the electrodes 12a and 12b. The absorption wavelength range when no voltage is applied and the shift direction and shift amount of the absorption wavelength range can be controlled by, for example, appropriately selecting the liquid crystal material and the solvatochromic dye to be used and by adjusting the voltage.

Next, the second embodiment will be described. In the second embodiment, employed is the structure in which the electrodes 12a and 12b are supported by the substrate 11a instead of the structure in which the electrodes 12a and 12b are supported by the substrates 11a and 11b, respectively.

Figure 10:
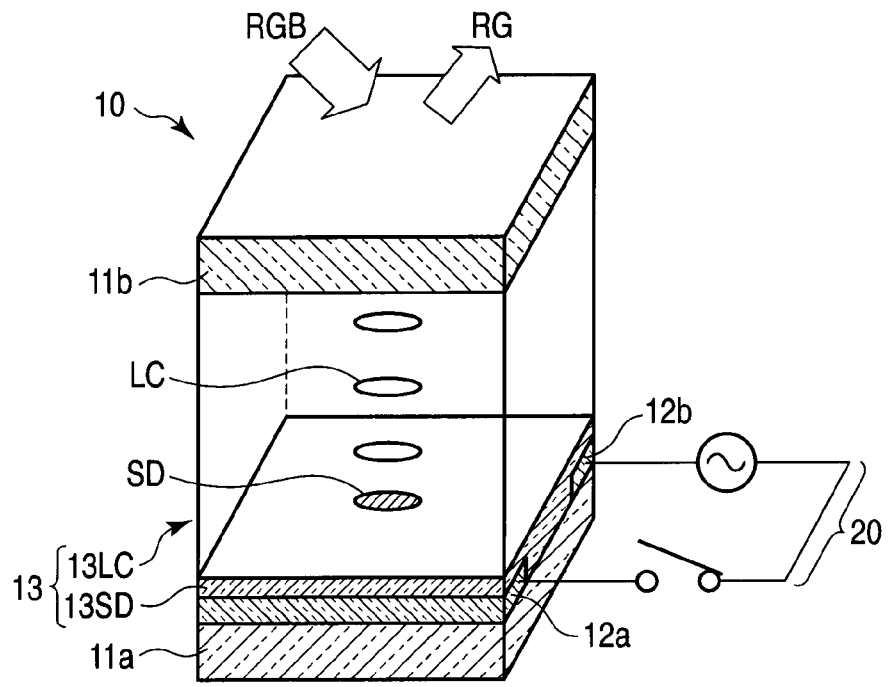
FIG. 10 is a view schematically showing a state in which an optical device according to the second embodiment displays yellow.
Figure 11:
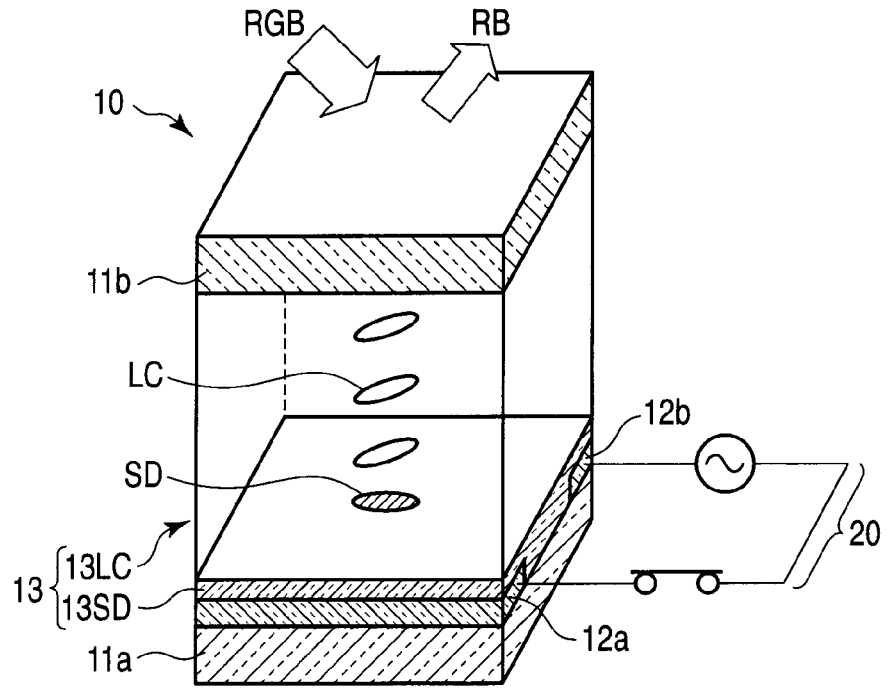
FIG. 11 is a view schematically showing a state in which the optical device of FIG. 10 displays magenta.

FIG. 10 is a view schematically showing a state in which an optical device according to the second embodiment displays yellow. FIG. 11 is a view schematically showing a state in which the optical device of FIG. 10 displays magenta. FIG. 12 is a view schematically showing a state in which the optical device of FIG. 10 displays cyan.

FIG. 13 is a view schematically showing a solvatochromic dye molecule and a liquid crystal molecule in the state of FIG. 10. FIG. 14 is a view schematically showing the solvatochromic dye molecule and the liquid crystal molecule in the state of FIG. 11. FIG. 15 is a view schematically showing the solvatochromic dye molecule and the liquid crystal molecule in the state of FIG. 12.

The optical device 10 shown in FIGS. 10 to 12 has the same structure as that of the optical device 10 described with reference to FIGS. 7 to 9 except that the following construction is employed.

In this optical device 10, both the electrodes 12a and 12b are interposed between the substrate 11a and the optically variable layer 13. The electrodes 12a and 12b each has a shape extending in one direction and are arranged such that their longitudinal directions are parallel with each other. The orientational direction of the solvatochromic dye molecules SD is almost parallel with the longitudinal directions of the electrodes 12a and 12b. The orientational direction of the liquid crystal molecules LC when no voltage is applied is also parallel with the longitudinal directions of the electrodes 12a and 12b.

In the case where no voltage is applied between the electrodes 12a and 12b, the orientational direction of the liquid crystal molecules LC is parallel with the orientational direction f the dye molecules SD as shown in FIGS. 10 and 13. This state is the same as the state described with reference to FIG. 7. Therefore, in this case, the observer perceives, for example, yellow that is in relation of complementary colors with blue.

When a relatively low voltage is applied between the electrodes 12a and 12b, the liquid crystal molecules LC are oriented in the direction that is almost parallel with the display surface and inclined with respect to the longitudinal directions of the electrodes 12a and 12b. This state is equivalent to the state described with reference to FIG. 8. Therefore, in this case, the observer perceives magenta that is in relation of complementary colors with green.

When the voltage applied between the electrodes 12a and 12b is raised, the liquid crystal molecules LC orient in the direction that is almost parallel with the display surface and almost perpendicular to the longitudinal directions of the electrodes 12a and 12b. This state is equivalent to the state described with reference to FIG. 9. Therefore, in this case, the observer perceives cyan that is in relation of complementary colors with red.

Next, the third embodiment will be described. In the third embodiment, the solvatochromic dye is not immobilized but is mixed with the liquid crystal material.

Figure 16:
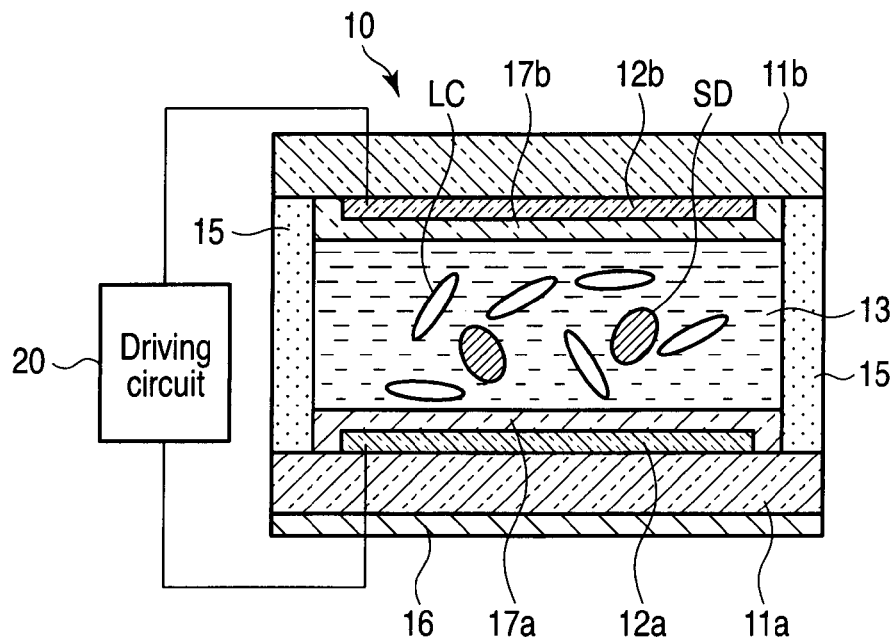
FIG. 16 is a view schematically showing a state in which an optical device according to the third embodiment displays an image in a certain color.
Figure 17:
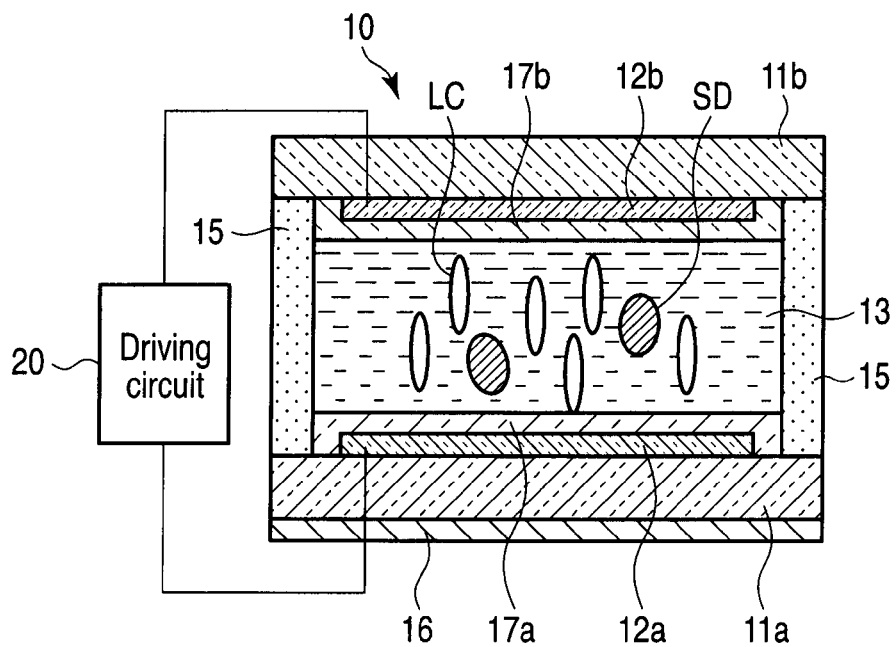
FIG. 17 is a view schematically showing a state in which the optical device of FIG. 16 displays an image in another color.

FIG. 16 is a view schematically showing a state in which an optical device according to the third embodiment displays an image in a certain color. FIG. 17 is a view schematically showing a state in which the optical device of FIG. 17 displays an image in another color. Note that the reference symbols 15 and 16 indicate the above-described sealing layer and reflective layer, respectively.

The optical device 10 shown in FIGS. 16 and 17 has the same structure as that of the optical device 10 described with reference to FIGS. 7 to 9 except for the following.

In this optical device 10, the optically variable layer 13 has a single-layer structure. The optically variable layer 13 is a layer of a mixture containing the solvatochromic dye and the liquid crystal material. The electrodes 12a and 12b are covered with the insulating layer 17a and 17b, respectively.

As shown in FIG. 16, in the case where no voltage is applied, the dipole moments of the liquid crystal molecules LC orient randomly. Alternatively, in this case, the liquid crystal molecules LC orient at a low degree of orientational order. Similarly, in this case, the dipole moments of the solvatochromic dye molecules SD orient randomly. Alternatively, in this case, the solvatochromic dye molecules SD orient at a low degree of orientational order. Here, as an example, it is supposed that the dipole moments of the liquid crystal molecules LC and the dipole moments of the solvatochromic dye molecules SD orient randomly in the case where no voltage is applied. Note that in this case, the solvatochromic dye molecules SD are placed in an environment in which the liquid crystal material has an average dielectric constant.

When a sufficiently high voltage is applied between the electrodes 12a and 12b, the liquid crystal molecules LC are oriented almost perpendicular to the display surface. This makes the degree of orientational order of the solvatochromic dye molecules SD higher. As a result, the solvatochromic dye changes its color. That is, the display color, in particular, the hue changes.

For example, in the case of using a solvatochromic dye exhibiting negative solvatochromism such as Reichardt dye, when the voltage applied between the electrodes 12a and 12b is raised, the absorption spectrum of the optically variable layer 13 shifts toward shorter wavelengths. On the other hand, in the case of using a solvatochromic dye exhibiting positive solvatochromism such as Phenol Blue dye, when the voltage applied between the electrodes 12a and 12b is raised, the absorption spectrum of the optically variable layer 13 shifts toward longer wavelengths.

As above, in the case of mixing the solvatochromic dye and the liquid crystal material together, the display color can be changed by changing the voltage applied between the electrodes 12a and 12b.

Further, in this optical device 10, the formation of the dye layer 13SD is unnecessary because the solvatochromic dye is mixed with the liquid crystal material. Therefore, the optical device 10 can be manufactured easily as compared with the optical device 10 described with reference to FIGS. 7 to 9.

The mixture including the solvatochromic dye and the liquid crystal material may be micro-capsulated. That is, the optically variable layer can be formed using microcapsules each including the mixture and a transparent film encapsulating the mixture.

It is possible that a part of the solvatochromic dye is mixed with the liquid crystal material and the remainder of the solvatochromic dye is immobilized. Both the electrodes 12a and 12b may be supported by the substrate 11a.

Next, the fourth embodiment will be described. In the fourth embodiment, the solvatochromic dye molecules are immobilized without making them oriented or at a low degree of orientational order.

FIG. 18 is a view schematically showing a state in which an optical device according to the fourth embodiment displays an image in a certain color. FIG. 19 is a sectional view schematically showing a state in which the optical device of FIG. 18 displays an image in another color. FIGS. 18 and 19 show a part of the optically variable layer 13 of the optical device 10. FIG. 18 shows the optically variable layer 13 when no voltage is applied. FIG. 19 shows the optically variable layer 13 when a sufficiently high voltage is applied.

The optical device 10 shown in FIGS. 18 and 19 has the same structure as that of the optical device 10 described with reference to FIGS. 7 to 9 except for the following.

In this optical device 10, the optically variable layer 13 further includes a porous material 13P in addition to the solvatochromic dye and the liquid crystal material. The porous material 13P forms layer interposed between the electrodes 12a and 12b. The solvatochromic dye molecules SD are immobilized on walls of pores in the porous material 13P.

As shown in FIG. 18, when no voltage is applied, the dipole moments of the liquid crystal molecules LC are almost parallel with the dipole moments of the solvatochromic dye molecules SD in the vicinity of the above liquid crystal molecules LC. Therefore, the optically variable layer 13 displays, for example, the same color as that described with reference to FIG. 7.

When a sufficiently high voltage is applied between the electrodes 12a and 12b, the liquid crystal molecules LC orient almost one direction as shown in FIG. 19. Accordingly, the average value of angles formed by the dipole moments of the liquid crystal molecules LC and the dipole moments of the solvatochromic dye molecules SD in the vicinity of the above liquid crystal molecules LC increases. As a result, the solvatochromic dye changes its color. That is, the display color, in particular, the hue changes.

As above, in the case where the solvatochromic dye is immobilized on the porous material, changing the voltage applied between the electrodes 12a and 12b can change the display color.

Further, the porous material 13P has a surface area substantially larger than that of the electrode 12a. Therefore, in the case of using the porous material 13P, more solvatochromic dye molecules can be immobilized. Consequently, a higher color density can be achieved.

It is possible that a part of the solvatochromic dye is immobilized and the remainder of the solvatochromic dye is mixed with the liquid crystal material. Both the electrodes 12a and 12b may be supported by the substrate 11a.

The materials, etc. of the above optical devices 10 will be described.

As the substrates 11a and 11b, used are, for example, substrates having sufficient strength and insulating property. As the substrate 11b, a substrate having a light-transmitting property, typically, a transparent substrate is used. The substrate 11a may have a light-transmitting property or not. Examples of the material of the substrates 11a and 11b include glasses, plastics, ceramics and metals.

When either or both the electrodes 12a and 12b is provided to be interposed between the optically variable layer 13 and the observer, such an electrode should have a light-transmitting property and is typically transparent. As a material of the electrode having a light-transmitting property, for example, a transparent conductive oxide such as indium tin oxide (ITO) can be used. As a material of an electrode that is opaque or semitransparent to light, for example, a metal such as aluminum, nickel, copper, silver, gold or platinum or an alloy thereof can be used. Each of the electrodes 12a and 12b may have a single-layer structure or a multilayered structure. Each of the electrodes 12a and 12b can be formed by, for example, performing film formation using vapor deposition method such as evaporation or sputtering and then patterning the film using photolithography, etc., if necessary.

As a material of the sealing layer 15, for example, an adhesive can be used.

In the case where spacers are laced between the substrates 11a and 11b, for example, the same granular or columnar spacers as those used in liquid crystal displays can be used. The granular or columnar spacers are electrically insulating. Examples of the material of the granular spacers include polymers such as divinylbenzene and polystyrene and inorganic compounds such as alumina and silica. Examples of the material of the columnar spacers include positive- or negative-type photosensitive resins that can be used in photolithography. For example, a photosensitive resin containing polyimide, polyamide, polyvinyl alcohol, polyacrylamide, cyclized rubber, novolac resin, polyester, polyurethane, acrylic resin, bisphenol resin or gelatin can be used.

At least one of the electrodes 12a and 12b may be covered with an insulating layer. Examples of the material of the insulating layer include organic materials such as polyimide, polyamide, polyvinyl alcohol, polyacrylamide, cyclized rubber, novolac resin, polyester, polyurethane, acrylic resin, bisphenol resin and gelatin, and inorganic materials such as silicon oxide and silicon nitride. The insulating layer may have a single-layer structure or multilayered structure. The insulating layer can be formed by, for example, the Langmuir-Blodgett technique in which a monomolecular film on a water surface is transferred onto an electrode or the vapor deposition such as evaporation. An alignment treatment such as rubbing treatment can be performed n the insulating layer in order to control the orientation of the material having dielectric anisotropy such as liquid crystal material.

The material having dielectric anisotropy is a material that has dielectric anisotropy in a molecule, that is, a material in which a polarization such as orientation polarization, electronic polarization or atomic polarization has anisotropy in a molecule. The material having dielectric anisotropy may be an organic or inorganic material.

As the material having dielectric anisotropy, for example, a liquid crystal material can be used. The liquid crystal material may be a liquid crystal compound or a composition containing liquid crystal compounds. Alternatively, the liquid crystal material may be a composition containing one or more liquid crystal compounds and one or more compounds other than the liquid crystal compounds. Examples of the liquid crystal material include a nematic liquid crystal material, a cholesteric or chiral nematic liquid crystal material (hereinafter, the cholesteric liquid crystal material and/or chiral nematic liquid crystal is referred to as "cholesteric liquid crystal material"), a mixture of the nematic liquid crystal material and the cholesteric liquid crystal material or a chiral agent, and a smectic liquid crystal material. The material having dielectric anisotropy may be composed only of components each having dielectric anisotropy or further contain a material that does not have dielectric anisotropy.

Preferably, the dielectric anisotropy of the liquid crystal material has a large absolute value. Considering the shift amount of the absorption wavelength that is necessary for an optical device to display a color image, the absolute value of the dielectric anisotropy, which is a value obtained by subtracting the relative dielectric constant for the minor axis of a liquid crystal molecule from the relative dielectric constant for the major axis of the liquid crystal molecule, is preferably 5 or more, and more preferably 10 or more.

As the solvatochromic dye, a compound that exhibits solvatochromism or a composition that contains one or more compounds exhibiting solvatochromism can be used. Examples of the compound exhibiting solvatochromism include the solvatochromic dyes described in Chem. Rev., 94, 2319 (1994), the contents of which are incorporated herein by reference.

Preferably, the solvatochromic dye is the one whose shift amount of the absorption wavelength is large with respect to the change in a polarity of the solvent. In terms of the color density, it is desirable that the solvatochromic dye is an organic material having a high absorbance. For example, Reichardt dye can be used as such a solvatochromic dye.

For immobilizing the solvatochromic dye, a chemical linkage or a physical linkage such as physical adsorption can be used. For more stable immobilization, a chemical linkage is preferable. The solvatochromic dye may be immobilized on an organic or in organic material. For example, the solvatochromic dye may be incorporated in a principal or side chain of a polymeric material supported by the electrode 12a or 12b. As described above, the solvatochromic dye is preferably immobilized on a porous material.

In the case of orienting the solvatochromic molecules, for example, an alignment layer can be utilized. For example, the solvatochromic molecules can be oriented and immobilized by applying the alignment layer with a solution containing the solvatochromic dye and drying the coating film. Alternatively, in the case where the solvatochromic molecules are incorporated in principal or side chains of a polymeric material, the solvatochromic molecules can be oriented by forming a layer including the polymeric material and performing a drawing or rubbing treatment on the film.

Preferably, the absorption axis of the solvatochromic dye is almost perpendicular to the display surface. In this case, the solvatochromic dye can absorb light at a higher efficiency.

In the case of orienting the solvatochromic molecules, the direction of the dipole moment of the solvatochromic dye in the ground or excited state is set, for example, parallel with the orientational direction in which the alignment layer orients the liquid crystal molecules and perpendicular to the direction of the electric field generated when a voltage is applied between the electrodes 12a and 12b. Alternatively, the direction of the dipole moment of the solvatochromic dye in the ground or excited state is set perpendicular to the orientational direction in which the alignment layer orients the liquid crystal molecules and parallel with the direction of the electric field generated when a voltage is applied between the electrodes 12a and 12b. In these cases, the amount of change in the absorption wavelength due to the change in the applied voltage is maximized. Note that the term "parallel" used herein means the condition that an angle formed by two directions falls within a range of $-20°$ to $+20°$. Note also that the term "perpendicular" used herein means the condition that an angle formed by two directions falls within a range of $+70°$ to $+110°$.

As the material of the reflective layer 16, for example, a metal such as aluminum or silver or an alloy thereof can be used. The reflective layer 16 can be omitted, for example, in the case where the electrode 12a serves as the reflective layer or the optical device 10 is a transmissive device.

In the case where the driving circuit 20 outputs a direct-current voltage as a drive voltage, the color to be displayed by the optical device 10 can be controlled according to the magnitude of the drive voltage. In the case where the driving circuit 20 outputs an alternating-current voltage as a drive voltage, the color to be displayed by the optical device 10 can be controlled according to at least one of the magnitude and frequency of the drive voltage. Considering the offset voltage that is necessary due to ionic impurities, etc., the alternating-current-driving method is preferable to the direct-currentdriving method. In the case where the optical device 10 is applied to a display and the alternating-current-driving method is employed, the frequency is preferably set within a range of 10 Hz to 1 kHz and more preferably set within a range of 30 Hz to 240 Hz in view of suppressing flicker and achieving a low power consumption.

The driving circuit 20 can change the wavelength at the maximum absorption, for example, over the almost entire visible range. In this case, considering the fact that the maximum absorption wavelengths for cyan, magenta and yellow dyes used in a color photography are about 650, 550 and 450 nm, respectively, the driving circuit 20 controls the operation of the optical device 10 such that each of the maximum absorption wavelengths shifts by preferably 100 nm or more, an more preferably 250 nm or more at the maximum. Note that the term "visible range" used herein means a wavelength range of 400 to 800 nm.

Some examples of the optical device will be described below.

EXAMPLE 1

In this example, the optical device 10 described with reference to FIGS. 16 and 17 was manufactured by the following method.

Prepared were two transparent substrates each made of non-alkali glass and having ITO electrodes 12a and 12b, respectively. Each of the glass substrates had a thickness of 0.7 mm.

Then, the electrode 12a was coated with polyimide using a spinner to form an insulating layer 17a having a thickness of 70 nm. As the polyimide, used was AL-1501 manufactured by JAPAN SYNTHETIC RUBBER CO., LTD. Subsequently, the periphery of the main surface of the substrate 11a was coated with an epoxy adhesive to be used as the sealing layer 15.

On the electrode 12b, an insulating layer 17b was formed by the method as that described for the insulating layer 17a. On the insulating layer 17b, spacer balls made of resin and having a diameter of 10 µm were dispersed.

Thereafter, the substrates 11a and 11b were bonded together such that the insulating layers 17a and 17b faced each other and the epoxy adhesive was cured. Thus, an empty cell was obtained.

Next, an isotropic mixture containing 96 parts by mass of nematic liquid crystal material and 4 parts by mass of solvatochromic dye was vacuum-injected into the empty cell to form an optically variable layer 13. As the nematic liquid crystal material, used was 4-cyano-4'-pentylbiphenyl manufactured by SIGMA-ALDRICH CORPORATION. As the solvatochromic dye, used was the Reichardt dye manufactured by SIGMA-ALDRICH CORPORATION.

After sealing the injection port of the cell, a reflective film 16 was laminated on the substrate 11a. As above, the optical device 10 shown in FIGS. 16 and 17 was completed.

The optical device 10 was connected to a driving circuit 20. Then, alternating-current voltage was applied between the electrodes 12a and 12b, and the color change responsive to the change in voltage was observed. Note that the waveform of the alternating-current voltage was a rectangular wave and the frequency was set at 30 Hz. FIG. 20 shows the result.

FIG. 20 is a graph showing an example of a color change responsive to a change in voltage. In FIG. 20, the abscissa indicates the wavelength, while the ordinate indicates the absorbance (arbitrary unit).

The optical device 10 displayed green when no voltage was applied (0 V). At this time, the wavelength at the maximum absorption was 680 nm as shown in FIG. 20. The optical device 10 displayed red when the applied voltage was set at 20 V. At this time, the wavelength at the maximum absorption was 580 nm as shown in FIG. 20.

EXAMPLE 2

In this example, the optical device 10 described with reference to FIGS. 16 and 17 was manufactured by the following method.

First an empty cell was formed by the same method as that described in Example 1.

Next, an isotropic mixture containing 96 parts by mass of nematic liquid crystal material and 4 parts by mass of solvatochromic dye was vacuum-injected into the empty cell to form an optically variable layer 13. As the nematic liquid crystal material, used was ZLI-4900-000 manufactured by MERCK & CO., INC. As the solvatochromic dye, used was the Reichardt dye manufactured by SIGMA-ALDRICH CORPORATION.

After sealing the injection port of the cell, a reflective film 16 was laminated on the substrate 11a. As above, the optical device 10 shown in FIGS. 16 and 17 was completed.

The optical device 10 was connected to a driving circuit 20. Then, alternating-current voltage was applied between the electrodes 12a and 12b, and the color change responsive to the change in voltage was observed. Note that the waveform of the alternating-current voltage was a rectangular wave and the frequency was set at 30 Hz.

As a result, the optical device 10 displayed light orange when no voltage was applied (0 V) and displayed reddish purple when the applied voltage was set at 15V.

EXAMPLE 3

FIG. 21 is a sectional view schematically showing an optical device according to Example 3. In this example, the optical device 10 shown in FIG. 21 was manufactured by the following method.

Prepared were two transparent substrates each made of non-alkali glass and having ITO electrodes 12a and 12b, respectively. Each of the glass substrates had a thickness of 0.7 mm.

Then, the electrode 12a was subjected to a rubbing treatment. Thereafter, the electrode 12a was coated with a solution containing a solvatochromic dye to form a dye layer 13SD having a thickness of 50 nm. As the solvatochromic dye, used was the Reichardt dye manufactured by SIGMA-ALDRICH CORPORATION. Subsequently, the periphery of the main surface of the substrate 11a was coated with an epoxy adhesive to be used as the sealing layer 15.

Next, the electrode 12b was coated with polyimide using a spinner and the coating film thus obtained was subjected to a rubbing treatment to form an insulating layer 17b having a thickness of 70 nm. As the polyimide, used was AL-1501 manufactured by JAPAN SYNTHETIC RUBBER CO., LTD. On the insulating layer 17b, spacer balls made of resin and having a diameter of 10 µm were dispersed.

Thereafter, the substrates 11a and 11b were bonded together such that the insulating layers 17a and 17b faced each other and the epoxy adhesive was cured. Thus, an empty cell was obtained.

Next, a fluorinated liquid crystal material in the isotropic phase was vacuum-injected into the empty cell to form an optically variable layer 13. As the nematic liquid crystal material, used was JC-1041 manufactured by CHISSO CORPORATION.

After sealing the injection port of the cell, a reflective film 16 was laminated on the substrate 11a. As above, the optical device 10 shown in FIG. 21 was completed.

The optical device 10 was connected to a driving circuit 20. Then, alternating-current voltage was applied between the electrodes 12a and 12b, and the color change responsive to the change in voltage was observed. Note that the waveform of the alternating-current voltage was a rectangular wave and the frequency was set at 30 Hz. FIG. 22 shows the result.

FIG. 22 is a graph showing another example of a color change responsive to a change in voltage. In FIG. 22, the abscissa indicates the wavelength, while the ordinate indicates the absorbance (arbitrary unit). The curve $C_{OFF}$ represents the absorption spectrum when no voltage was applied. The curves $C_{oN}(0)$, $C_{ON}(30)$ and $C_{ON}(90)$ represent the absorption spectrum just after starting the application of voltage, the absorption spectrum after 30 seconds had elapsed from starting the application of voltage, and the absorption spectrum after 90 seconds had elapsed from starting the application of voltage, respectively.

EXAMPLE 4

In this example, the optical device 10 shown in FIG. 21 was manufactured by the following method.

Prepared were two transparent substrates each made of non-alkali glass and having ITO electrodes 12a and 12b, respectively. Each of the glass substrates had a thickness of 0.7 mm.

Then, the electrode 12a was subjected to a rubbing treatment. Thereafter, the electrode 12a was coated with a solution containing a polymer having a solvatochromic dye molecules in its side chains to form a layer having a thickness of 30 nm. The layer was subjected to a rubbing treatment so as to obtain a dye layer 13SD. As the polymer, the compound represented by the chemical formula below was used. Subsequently, the periphery of the main surface of the substrate 11a was coated with an epoxy adhesive to be used as the sealing layer 15.

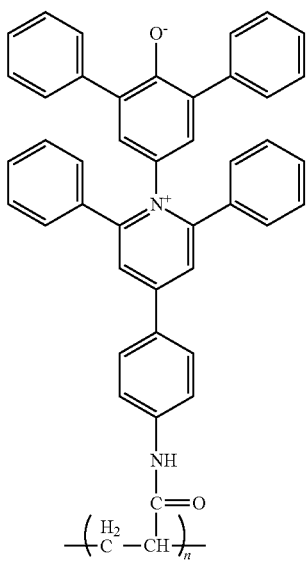

Next, the electrode 12b was coated with polyimide using a spinner and the coating film thus obtained was subjected to a rubbing treatment to form an insulating layer 17b having a thickness of 70 nm. As the polyimide, used was AL-1501 manufactured by JAPAN SYNTHETIC RUBBER CO., LTD. On the insulating layer 17b, spacer balls made of resin and having a diameter of 10 μm were dispersed.

Thereafter, the substrates 11a and 11b were bonded together such that the insulating layers 17a and 17b faced each other and the epoxy adhesive was cured. Thus, an empty cell was obtained.

Next, a nematic liquid crystal material manufactured by MERCK & CO., INC. was vacuum-injected in liquid crystal phase into the empty cell to form a liquid crystal layer 13LC. As the nematic liquid crystal material, used was the one that had a dielectric anisotropy $\Delta\in$ of 20 and a refractive index anisotropy $\Delta n$ of 0.15.

After sealing the injection port of the cell, a reflective film 16 was laminated on the substrate 11a. As above, the optical device 10 shown in FIG. 21 was completed.

The optical device 10 was connected to a driving circuit 20. Then, alternating-current voltage was applied between the electrodes 12a and 12b, and the color change responsive to the change in voltage was observed. Note that the waveform of the alternating-current voltage was a rectangular wave and the frequency was set at 30 Hz.

As a result, the optical device 10 displayed red when no voltage was applied (0 V) and displayed green when the applied voltage was set at 15 V.

EXAMPLE 5

In this example, the optical device 10 described with reference to FIGS. 18 and 19 was manufactured by the following method.

First, a heat treatment and an acid treatment were performed on a borosilicate soda-lime glass in this order to produce a layer of porous glass beads 13P having a pore diameter of 1 μm in a thickness of 3 μm. The porous glass beads were impregnated with an ethanol solution of the Reichardt dye so as to immobilize the Reichardt dye on the walls of the pores. The particles thus obtained were contained in a cell that included two glass substrates each having an ITO electrode on a surface thereof and a sealing layer. As the glass substrate, used were non-alkali glass substrates each having a thickness of 0.7 mm.

Then, a nematic liquid crystal material manufactured by MERCK & CO., INC. was vacuum-injected in liquid crystal phase into the cell. As the nematic liquid crystal material, used was the one that had a dielectric anisotropy $\Delta\in$ of 15 and a refractive index anisotropy $\Delta n$ of 0.18.

After sealing the injection port of the cell, a reflective film 16 was laminated on one of the substrates. As above, the optical device described with reference to FIGS. 18 and 19 was completed.

The optical device was connected to a driving circuit 20. Then, alternating-current voltage was applied between the electrodes, and the color change responsive to the change in voltage was observed. Note that the waveform of the alternating-current voltage was a rectangular wave and the frequency was set at 30 Hz.

As a result, the optical device displayed reddish purple when no voltage was applied (0 V) and displayed greenish-yellow when the applied voltage was set at 50V.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An optical device comprising:
   an optically variable layer including a material having dielectric anisotropy and a solvatochromic dye, wherein the material having dielectric anisotropy is a liquid crystal material, and the solvatochromic dye is immobilized; and
   first and second electrodes configured to apply a voltage to the optically variable layer.

2. The optical device according to claim 1, wherein the solvatochromic dye is immobilized on a porous material.

3. The optical device according to claim 1, wherein the solvatochromic dye is immobilized by a chemical bond.

4. The optical device according to claim 3, wherein the solvatochromic dye is incorporated in a principal or side chain of a polymeric material.

5. The optical device according to claim 1, wherein molecules of the solvatochromic dye anisotropically oriented.

6. The optical device according to claim 5, wherein the solvatochromic dye has an absorption axis parallel with a main surface of the optically variable layer.

7. The optical device according to claim 5, wherein the material having dielectric anisotropy is a liquid crystal material.

8. The optical device according to claim 5, further comprising an alignment layer in contact with a main surface of the optically variable layer and configured to control orientation of the liquid crystal material.

9. The optical device according to claim 8, wherein the solvatochromic dye has an electric dipole moment in a ground or excited state, the electric dipole moment being parallel with an alignment direction in which the alignment layer orients the liquid crystal material and perpendicular to a direction of electric field generated when a voltage is put across the first and second electrodes.

10. The optical device according to claim 8, wherein the solvatochromic dye has an electric dipole moment in a ground or excited state, the electric dipole moment being perpendicular to an alignment direction in which the alignment layer orients the liquid crystal material and parallel with a direction of electric field generated when a voltage is put across the first and second electrodes.

11. The optical device according to claim 1, wherein the solvatochromic dye is an organic material.

12. The optical device according to claim 1, wherein the solvatochromic dye has an intramolecular charge-transferring structure.

13. A display comprising:
   an optical device according to claim 1, and
   a driving circuit configured to put a drive voltage across the first and second electrodes.

* * * * *